US009742761B2

(12) United States Patent
Grunin et al.

(10) Patent No.: US 9,742,761 B2
(45) Date of Patent: Aug. 22, 2017

(54) DYNAMIC AUTHENTICATION FOR A COMPUTING SYSTEM

(71) Applicant: International Business Machines Corporation, Armonk, NY (US)

(72) Inventors: Galina Grunin, Briarcliff Manor, NY (US); David E. Nachman, Morristown, NJ (US); Nader M. Nassar, Yorktown Heights, NY (US); Tamer M. Nassar, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/936,736

(22) Filed: Nov. 10, 2015

(65) Prior Publication Data

US 2017/0134363 A1    May 11, 2017

(51) Int. Cl.
G06F 7/04 (2006.01)
H04L 29/06 (2006.01)
H04W 12/06 (2009.01)

(52) U.S. Cl.
CPC .......... *H04L 63/083* (2013.01); *H04W 12/06* (2013.01)

(58) Field of Classification Search
CPC ............................. H04L 63/083; H04W 12/06
USPC ...................................................... 726/2–10
See application file for complete search history.

(56) References Cited

U.S. PATENT DOCUMENTS

| 8,301,897 | B2 | 10/2012 | Turner |
| 8,590,030 | B1 | 11/2013 | Pei |
| 8,613,066 | B1* | 12/2013 | Brezinski ........... G07C 9/00166 |
| | | | 713/168 |
| 8,650,405 | B1 | 2/2014 | Dotan et al. |
| 8,832,807 | B1 | 9/2014 | Kuo et al. |
| 8,850,518 | B2 | 9/2014 | Naccache |
| 2005/0283444 | A1* | 12/2005 | Ekberg .................. G06Q 20/02 |
| | | | 705/67 |
| 2007/0118891 | A1* | 5/2007 | Buer ...................... G06F 21/34 |
| | | | 726/8 |

(Continued)

FOREIGN PATENT DOCUMENTS

| CN | 104683354 A | 6/2015 |
| CN | 104702410 A | 6/2015 |
| KR | 101440328 B1 | 9/2014 |
| WO | 0208974 A3 | 1/2002 |

OTHER PUBLICATIONS

Nassar et al., "Seed-based Authentication," 2015 International Conference on Collaboration Technologies and Systems (CTS) Year: 2015 pp. 345-350.*

(Continued)

*Primary Examiner* — Roderick Tolentino
(74) *Attorney, Agent, or Firm* — Edward J. Wixted, III

(57) ABSTRACT

A method, computer program product, and computer system for authenticating user access to a computing system using dynamic tokens are provided. A login request from a client is received, and in response, a token request from the client is issued. The token request identifies one or more sequence positions. One or more client tokens generated by the client are received based on the one or more sequence positions of the tokens. A sequence of tokens based on a first seed and a first algorithm are generated. The login request is authenticated by comparing the one or more client tokens with the sequence of tokens, based at least in part, on the one or more sequence positions.

17 Claims, 4 Drawing Sheets

(56) References Cited

U.S. PATENT DOCUMENTS

| | | | | |
|---|---|---|---|---|
| 2009/0240907 A1* | 9/2009 | Crandell | ................ | G06F 21/31 |
| | | | | 711/163 |
| 2010/0132019 A1* | 5/2010 | Hardt | ................... | H04L 63/08 |
| | | | | 726/6 |
| 2012/0151566 A1* | 6/2012 | Lin | ................... | H04L 63/0428 |
| | | | | 726/7 |
| 2012/0210408 A1* | 8/2012 | Lu | ................... | H04L 63/0846 |
| | | | | 726/6 |
| 2013/0167214 A1* | 6/2013 | Sanno | ................... | H04L 63/08 |
| | | | | 726/7 |
| 2014/0040627 A1* | 2/2014 | Logan | ................... | G06F 21/46 |
| | | | | 713/182 |
| 2014/0061302 A1 | 3/2014 | Hammad | | |
| 2014/0189359 A1 | 7/2014 | Marien et al. | | |
| 2015/0121463 A1 | 4/2015 | Anderson et al. | | |

OTHER PUBLICATIONS

Vipin et al., "A Multi Way Tree for Token Based Authentication," 2008 International Conference on Computer Science and Software Engineering Year: 2008, vol. 3 pp. 1011-1014.*

Eisinger, Jochen, "Exploiting known security holes in Microsoft's PPTP Authentication Extensions (MS-CHAPv2)", University of Freiburg, Jul. 23, 2001, pp. 1-8, <http://penguin-breeder.org/pptp/download/pptp_mschapv2.pdf>.

Tanvi et al., "Token Based Authentication using Mobile Phone", 2011 International Conference on Communication Systems and Network Technologies, IEEE Computer Society, © 2011 IEEE, DOI 10.1109/CSNT.2011.24, pp. 85-88.

* cited by examiner

DYNAMIC AUTHENTICATION FOR A COMPUTING SYSTEM

BACKGROUND OF THE INVENTION

The present invention relates generally to the field of user authentication, and more particularly to authenticating user access to a computing system using dynamic tokens.

Authentication is the process of determining whether someone or something is, in fact, who or what it is declared to be. Frequently, computer systems and web applications, use authentication to permit or restrict a user's access to the system or application. Various methods of authentication can be implemented to authorize a user's access to the system or application. Often, authentication includes a process of comparing credentials provided by a user with those on file in a database. The process of comparing credentials can be dynamic, such as a dynamic password, or static.

SUMMARY

According to one embodiment of the present invention, a method for authenticating user access to a computing system using dynamic tokens is provided. The method includes receiving, by one or more processors, a login request from a client and, in response, issuing, by one or more processors, a token request to the client, wherein the token request identifies one or more sequence positions; receiving, by one or more processors, one or more client tokens generated by the client based on the one or more sequence positions; generating, by one or more processors, a sequence of tokens based on a first seed and a first algorithm; and authenticating, by one or more processors, the login request by comparing the one or more client tokens with the sequence of tokens, based, at least in part, on the one or more sequence positions.

According to another embodiment of the present invention, a computer program product for authenticating user access to a computing system using dynamic tokens is provided. The computer program product comprises a computer readable storage medium and program instructions stored on the computer readable storage medium. The program instructions include program instructions to program instructions to receive a login request from a client and, in response, issue a token request to the client, wherein the token request identifies one or more sequence positions; program instructions to receive one or more client tokens generated by the client based on the one or more sequence positions; program instructions to generate a sequence of tokens based on a first seed and a first algorithm; and program instructions to authenticate the login request by comparing the one or more client tokens with the sequence of tokens, based, at least in part, on the one or more sequence positions.

According to another embodiment of the present invention, a computer system for authenticating user access to a computing system using dynamic tokens is provided. The computer system includes one or more computer processors, one or more computer readable storage media, and program instructions stored on the computer readable storage media for execution by at least one of the one or more processors. The program instructions include program instructions to program instructions to receive a login request from a client and, in response, issue a token request to the client, wherein the token request identifies one or more sequence positions; program instructions to receive one or more client tokens generated by the client based on the one or more sequence positions; program instructions to generate a sequence of tokens based on a first seed and a first algorithm; and program instructions to authenticate the login request by comparing the one or more client tokens with the sequence of tokens, based, at least in part, on the one or more sequence positions.

DETAILED DESCRIPTION

An embodiment of the present invention recognizes a common method of providing user authentication to computer systems and applications is through the secrets shared between clients and servers. Authentication secrets can vary widely and can by dynamic or static. For example, a dynamic authentication can include a dynamic password. In another example, a static authentication can include a cryptographic hash. An embodiment of the present invention recognizes that secrets stored in a database for exchanging between a client and server can be breached. Often, where the secrets are breached, user data is at risk of being compromised.

An embodiment of the present invention provides an authentication technique that protects data despite a breach in authentication data stored on either a client or a server. Embodiments of the present invention dynamically generates a request from the user each time the user attempts to access a computer system or application. A breach in authentication data does not result in compromised user data, as the authentication question and answer change each time authentication is required.

Figure 1:
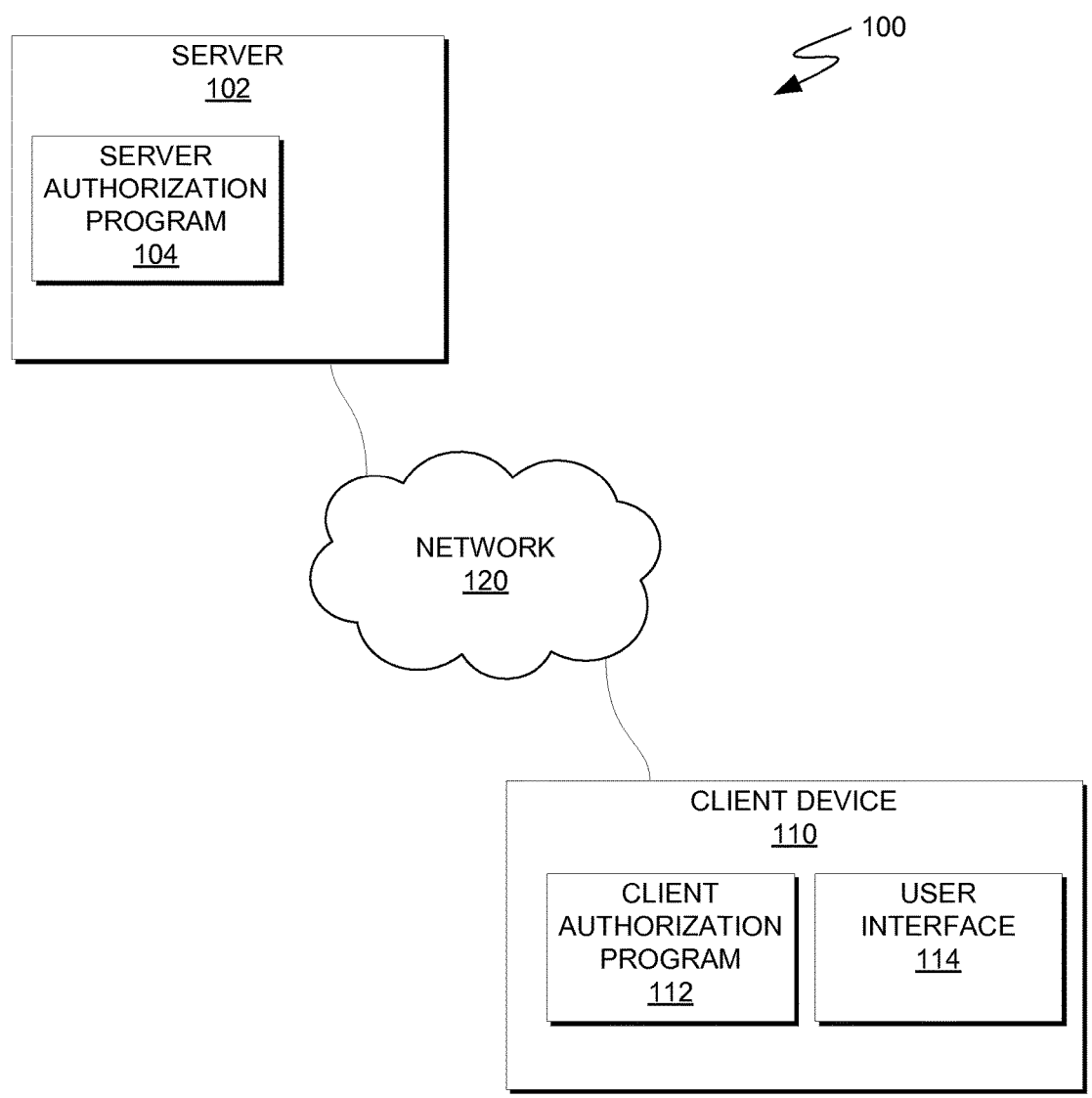
FIG. 1 is a functional block diagram illustrating a computing environment, in accordance with an embodiment of the present invention.

The present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes server 102 and client device 110 connected over network 120. Server 102 includes server authorization program 104.

In various embodiments, server 102 is a computing device that can be a standalone device, a server, a laptop computer, a tablet computer, a netbook computer, a personal computer (PC), or a desktop computer. In another embodiment, server 102 represents a computing system utilizing clustered computers and components to act as a single pool of seamless resources. In general, server 102 can be any computing device or a combination of devices with access to client device 110, and with access to and/or capable of executing server authorization program 104. Server 102 may include internal and external hardware components, as depicted and described in further detail with respect to FIG. 4.

In this exemplary embodiment, server authorization program 104 is stored on server 102. In other embodiments, server authorization program 104 may reside on another computing device, provided that it can access and is accessible by client device 110. In yet other embodiments, server authorization program 104 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between server 102 and client device 110, in accordance with a desired embodiment of the present invention.

Server authorization program 104 operates to manage user authentication to a system or application. Server authorization program 104 registers one or more users. Server authorization program 104 generates and distributes an algorithm to each registered that generates tokens for user authentication. In some embodiments, server authorization program 104 distributes a unique algorithm to each user. Server authorization program 104 authenticates a seed during user registration and tokens during user authentication.

In various embodiments of the present invention, client device 110 can be a laptop computer, a tablet computer, a netbook computer, a personal computer (PC), a desktop computer, a personal digital assistant (PDA), a smart phone, or any programmable electronic device capable of communicating with server 102 via network 120. In this exemplary embodiment, client authorization program 112 and user interface 114 stored on client device 110. In other embodiments, client authorization program 112 and user interface 114 may reside on another computing device, provided that each can access and is accessible by client device 110. In yet other embodiments, client authorization program 112 and user interface 114 may be stored externally and accessed through a communication network, such as network 120.

Client authorization program 112 operates to register and authenticate a user of client device 110 with server authorization program 104. Client authorization program 112 generates a seed, which is sent to server authorization program 104 to register a user. Client authorization program 112 receives an algorithm from server authorization program 104 and used the algorithm to create tokens for user authentication. In some embodiments, a user interacts with client authorization program 112 via user interface 114. User interaction can include, for example, initiating user registration, inputting user credentials, and initiating user authentication.

Client device 110 includes a user interface (UI) 114, which executes locally on client device 110 and operates to provide a UI to a user of client device 110. User interface 114 further operates to receive user input from a user via the provided user interface, thereby enabling the user to interact with client device 110. In one embodiment, user interface 114 provides a UI that enables a user of client device 110 to interact with client authorization program 112 and server authorization program 104 of server 102 via network 120. In various examples, the user interacts with client authorization program 112 in order to register a user with server authorization program 104. In other examples, the user interacts with client authorization program 112 in order to request access to a system or application. In one embodiment, user interface 114 is stored on client device 110. In other embodiments, user interface 114 is stored on another computing device (e.g., server 102), provided that user interface 114 can access and is accessible by at least client authorization program 112.

Figure 2:
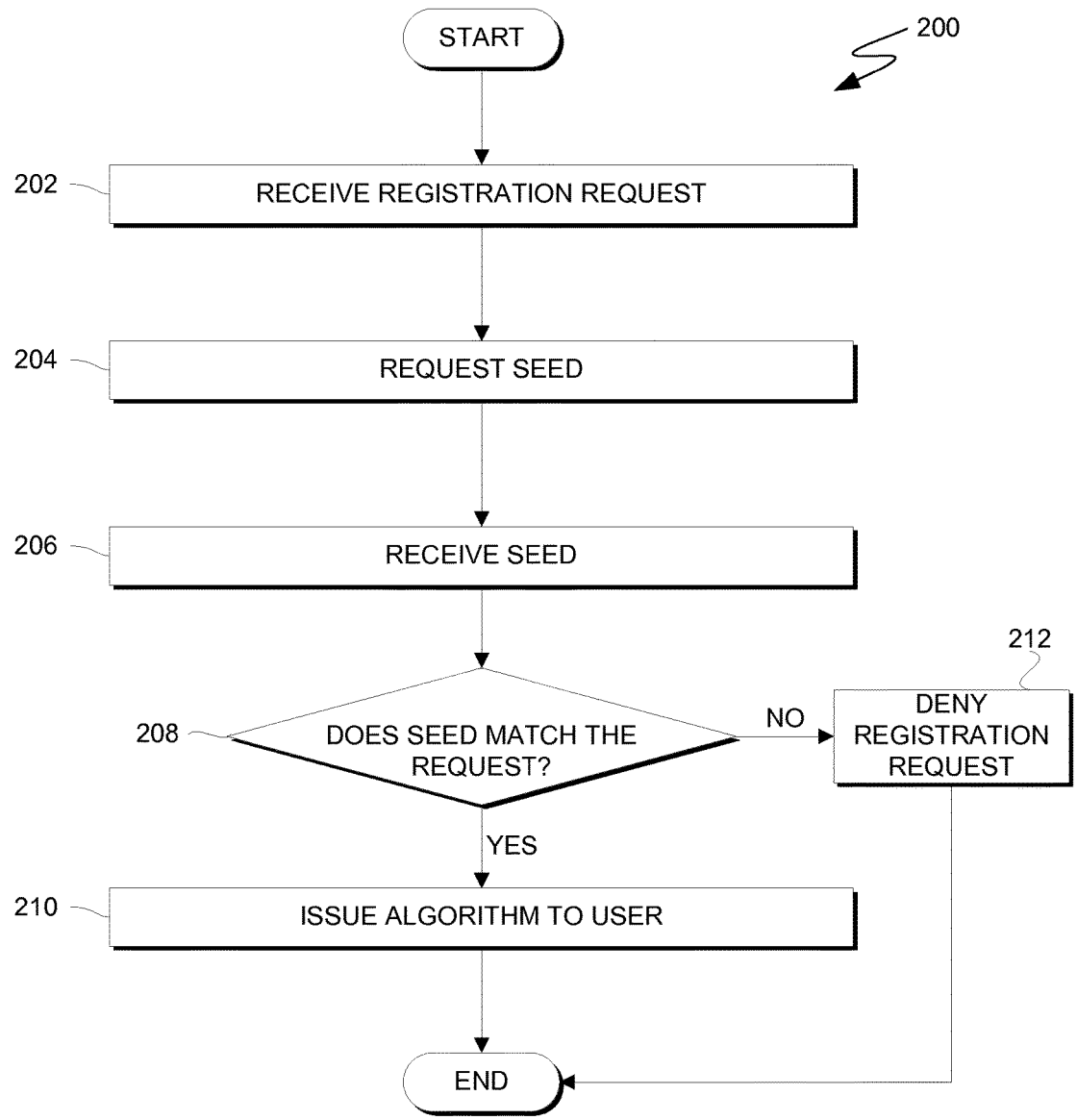
FIG. 2 is a flowchart depicting operations for registering a user for dynamic authentication, on a computing device within the computing environment of FIG. 1, in accordance with an embodiment of the present invention.

FIG. 2 is a flowchart depicting operations for registering a user for dynamic authentication, on a computing device within the computing environment of FIG. 1, in accordance with an embodiment of the present invention. For example, FIG. 2 is a flowchart depicting operations 200 of server authorization program 104, on server 102 within computing environment 100.

In step 202, server authorization program 104 receives a registration request. In some embodiments, a user requests registration each time the user uses a new device to access the system or application. For example, each device used by a user is registered with server authorization program 104. In other embodiments, the user needs only register the first time they attempt to access the system or application. For example, subsequent devices communicate with the first registered device to access the algorithm for user authentication.

In step 204, server authorization program 104 requests a seed from client authorization program 112. Server authorization program 104 requests some information (i.e., the seed) from the user to verify the user's identity. In some embodiments, the seed is a random number. In other embodiments, the seed is a password or a biometric. In still other embodiments, the seed is a unique file.

In step 206, server authorization program 104 receives a seed from client authorization program 112. In some embodiments, client authorization program 112 sends the seed in response to receiving the request. In some embodiments, client authorization program 112 issues a prompt, to a user of client device 110, requesting information. For example, client authorization program 112 requests a password or biometric from the user. In other embodiments, client authorization program 112 automatically sends the seed in response to receiving the request. For example, client authorization program 112 has the access to the information required for the seed.

In decision 208, server authorization program 104 determines whether the seed matches the request. If server authorization program 104 determines that the seed matches the request (decision 208, YES branch), then server authorization program 104 registers the user and issues an algorithm to client authorization program 112. The issued algorithm is registered to the user. If server authorization program 104 determines that the seed does not match the request (decision 208, NO branch), then server authorization program 104 denies the user registration request (step 212). In some embodiments, the user will have to initiate a new registration request in response to server authorization program 104 denying the request. In other embodiments, server authorization program 104 requests another seed in response to determining that the seed does not match the request.

In step 210, server authorization program 104 issues an algorithm to client authorization program 112. In some embodiments, the algorithm is registered to the user. The algorithm allows client authorization program 112 to generate tokens used in operations 300, depicted in FIG. 3. The algorithm uses a hashing function to generate tokens. In some embodiments, where the algorithm is registered to the user, the algorithm writes user-identifying information to the tokens. For example, the token can include an algorithm registration number, which allows server authorization program 104 to associate the token with the user. In some embodiments, server authorization program 104 issues a login request seed to client authorization program 112. The login request seed is used by client authorization program 112 to initiate a user login.

Figure 3:
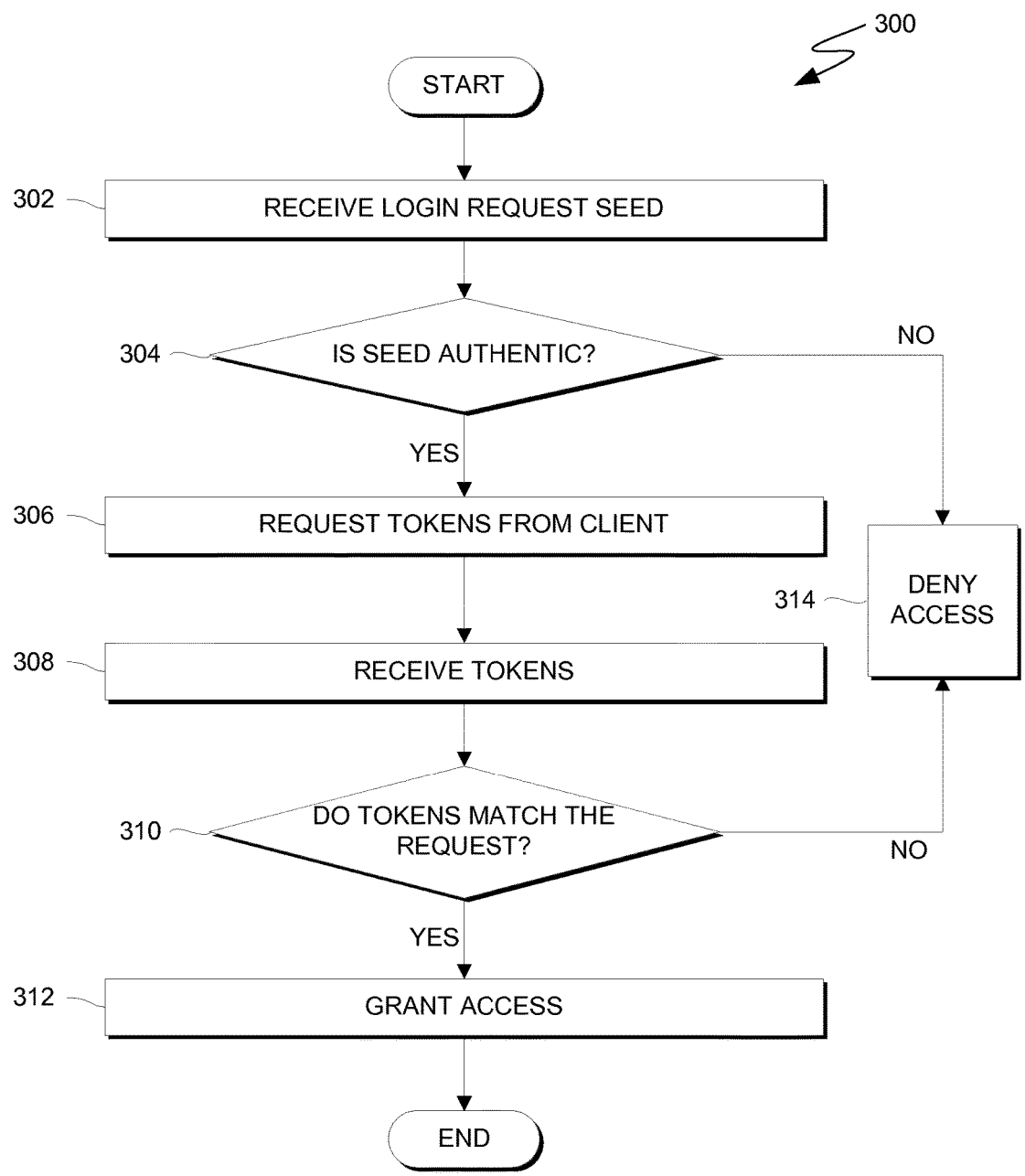
FIG. 3 is a flowchart depicting operations for dynamically authenticating a user, on a computing device within the computing environment of FIG. 1, in accordance with an embodiment of the present invention.

FIG. 3 is a flowchart depicting operations for dynamically authenticating a user, on a computing device within the computing environment of FIG. 1, in accordance with an embodiment of the present invention. For example, FIG. 3 is a flowchart depicting operations 300 of server authorization program 104, on server 102 within computing environment 100.

In step 302, server authorization program 104 receives a login request seed. The login request seed is sent by a user from client authorization program 112. In some embodiments, a login request seed cannot be sent from a client device unless the client device has successfully completed the registration as depicted in operations 200. In some embodiments, the login request seed is received in response to a user attempting to access a system or application. In other embodiments, the login request seed is received in response to a user interaction with user interface 114 (e.g., the user requests client authorization program 112 send the login request seed). In some embodiments, the login request seed is the same seed used in operations 200. In other embodiments, server authorization program 104 assigns the client device a seed to use in the login request process. Where the login request seed is assigned, the seed is issued to client authorization program 112 during the registration operations 200. In some embodiments, the login request seed is used by server authorization program 104 to identify the client device.

In decision 304, server authorization program 104 determines whether the seed is authentic. If server authorization program 104 determines that the login request seed is authentic (decision 304, YES branch), then server authorization program 104 requests tokens from client authorization program 112. If server authorization program 104 determines that the login request seed is not authentic (decision 304, NO branch), then server authorization program 104 denies the user access to the system or application (step 314). In embodiments where the login request seed is assigned by server authorization program 104, the login request seed is determined to be authentic if the received seed matches the assigned seed. In embodiments where the login request seed is the same as the seed used in operations 200, server authorization program 104 compares the received login request seed to the seed previously received from client device 110.

In step 306, server authorization program 104 requests tokens from client authorization program 112. The request for tokens instructs client authorization program 112 to generate a specified number of tokens that form a sequence of tokens. The request for tokens also instructs client authorization program 112 to send one or more of the generated tokens to server authorization program 104. The request for tokens specifies the one or more tokens to send by position within the sequence of tokens. For example, the token request instructs client authorization program 112 to generate twelve tokens and send the third, fifth, and tenth tokens to server authorization program 104. In some embodiments, server authorization program 104 define a time interval in which the tokens must be returned. In these embodiments, where the tokens are not returned within the defined time interval, server authorization program 104 will terminate operations 300 and require the user to initiate a new login request.

In step 308, server authorization program 104 receives tokens. Client authorization program 112 generates the tokens using the algorithm received in operations 200. Based on the instructions given in step 306, client authorization program 112 generates a specified number of tokens and sends select tokens to server authorization program 104.

In decision 310, server authorization program 104 determines whether the tokens received match the tokens requested. If server authorization program 104 determines that the tokens match the request (decision 310, YES branch), then server authorization program 104 grants the user access to the system or application. If server authorization program 104 determines that the tokens do not match the request (decision 310, NO branch), then server authorization program 104 denies the user access to the system or application (step 314).

In step 312, server authorization program 104 grants the access request. In order to gain access to the system or application, the client device needs to have an authenticated seed, the registered algorithm, and the token sequence requested by server authorization program 104. If the client device is missing any one of the authentication pieces (i.e., seed, algorithm, or tokens) access to the system or application is denied.

Figure 4:
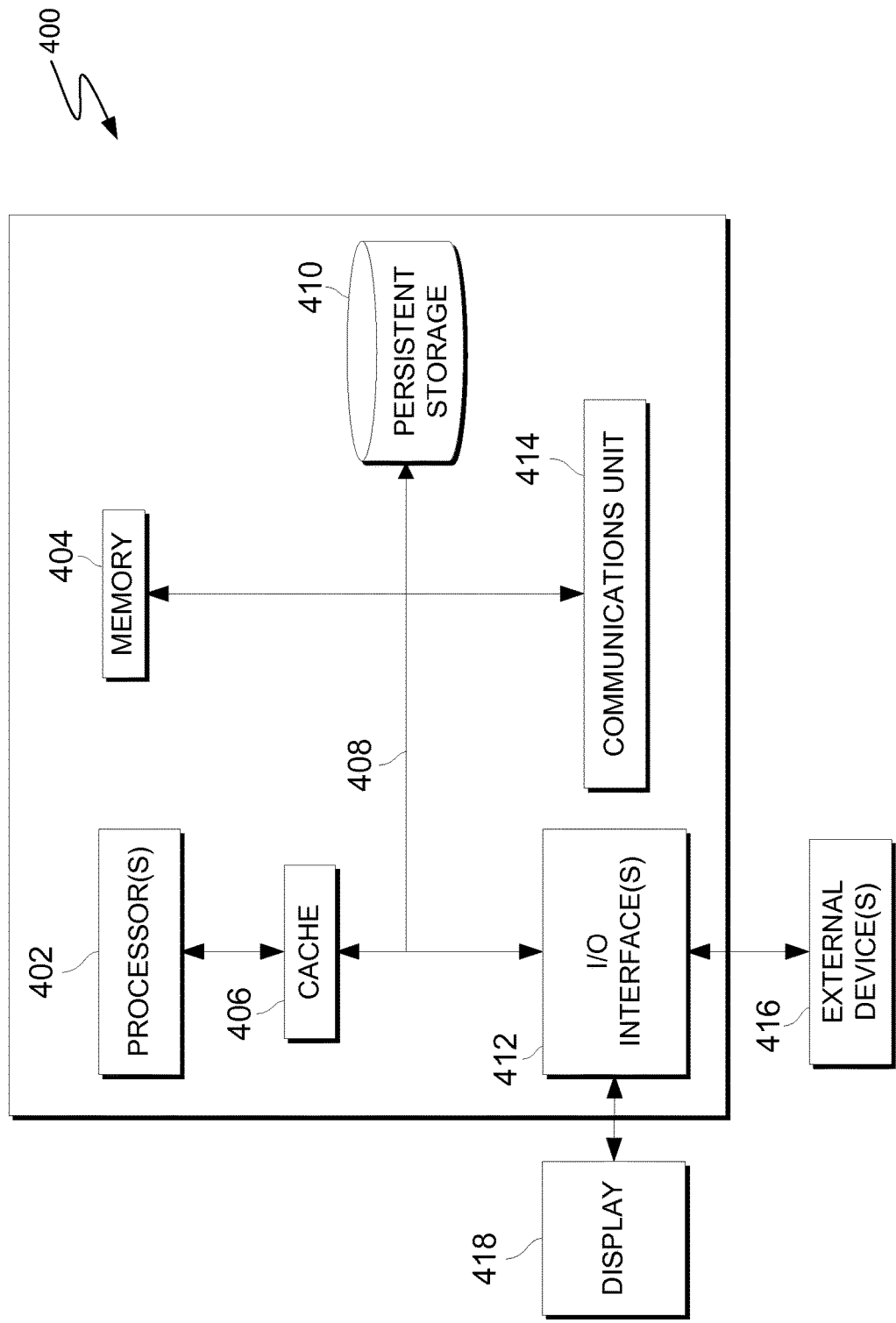
FIG. 4 is a block diagram of components of a computing device executing operations for dynamic authentication, in accordance with an embodiment of the present invention.

FIG. 4 is a block diagram of components of a computing device, generally designated 400, in accordance with an embodiment of the present invention. In one embodiment, computing device 400 is representative of server 102. For example, FIG. 4 is a block diagram of server 102 within computing environment 100 executing operations of server authorization program 104.

It should be appreciated that FIG. 3 provides only an illustration of one implementation and does not imply any limitations with regard to the environments in which different embodiments may be implemented. Many modifications to the depicted environment may be made.

Computing device 400 includes communications fabric 408, which provides communications between computer processor(s) 402, memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer-readable storage media. In this embodiment, memory 404 includes random access memory (RAM). In general, memory 404 can include any suitable volatile or non-volatile computer readable storage media. Cache 406 is a fast memory that enhances the performance of processors 402 by holding recently accessed data, and data near recently accessed data, from memory 404.

Program instructions and data used to practice embodiments of the present invention may be stored in persistent storage 410 and in memory 404 for execution by one or more of the respective processors 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer-readable storage medium that is also part of persistent storage 410.

Communications unit 414, in these examples, provides for communications with other data processing systems or devices, including resources of network 120. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to computing device 400. For example, I/O interface 412 may provide a connection to external devices 416 such as a keyboard, keypad, a touch screen, and/or some other suitable input device. External devices 416 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 410 via I/O interface(s) 412. I/O interface(s) 412 also connect to a display 418.

Display 418 provides a mechanism to display data to a user and may be, for example, a computer monitor, or a television screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a login request from a client and, in response, issuing, by one or more processors, a token request to the client, wherein the token request identifies a plurality of token positions within a first ordered set of tokens generated by the client using a first seed and a first algorithm;
   receiving, by one or more processors, a plurality of client tokens generated by the client based on the plurality of token positions within the first ordered set of tokens;
   generating, by one or more processors, a second ordered set of tokens based on the first seed and the first algorithm;
   authenticating, by one or more processors, the login request by comparing the plurality of client tokens with the second ordered set of tokens, based, at least in part, on the plurality of token positions; and
   granting access to an electronic resource by a communications link to the client and a server.

2. The method of claim 1, wherein the token request identifies the first algorithm.

3. The method of claim 2, further comprising:
   receiving, by one or more processors, the first seed from the client prior to receiving the login request.

4. The method of claim 3, wherein issuing the token request is in further response to determining that the first seed matches a second seed included in the login request.

5. The method of claim 2, further comprising:
   providing, by one or more processors, the first algorithm to the client prior to receiving the login request.

6. The method of claim 1, further comprising:
   selecting, by one or more processors, the first algorithm from among a plurality of algorithms based, at least in part, on the login request.

7. The method of claim 6, wherein the plurality of algorithms correspond to registered users.

8. A computer program product, the computer program product comprising:
   a computer readable storage device and program instructions stored on the computer readable storage device, the program instructions comprising:
   program instructions to receive a login request from a client and, in response, issue a token request to the client, wherein the token request identifies a plurality of token-positions within a first ordered set of tokens generated by the client using a first seed and a first algorithm;
   program instructions to receive a plurality of client tokens generated by the client based on the plurality of token positions within the first ordered set of tokens;
   program instructions to generate a second ordered set of tokens based on the first seed and the first algorithm;
   program instructions to authenticate the login request by comparing the plurality of client tokens with the second ordered set of tokens, based, at least in part, on the plurality of token positions; and
   program instructions to grant access to an electronic resource by a communications link to the client and a server.

9. The computer program product of claim 8, wherein the token request identifies the first algorithm.

10. The computer program product of claim 9, further comprising:
    program instructions to receive the first seed from the client prior to receiving the login request, wherein the token request is issued in further response to program instructions to determine that the first seed matches a second seed included in the login request.

11. The computer program product of claim 9, further comprising:
    program instructions to provide the first algorithm to the client prior to receiving the login request.

12. The computer program product of claim 8, further comprising:
    program instructions to select the first algorithm from among a plurality of algorithms based, at least in part, on the login request, wherein the plurality of algorithms correspond to registered users.

13. A computer system, the computer system comprising:
    one or more computer processors;
    one or more computer readable storage media;
    program instructions stored on the computer readable storage media for execution by at least one of the one or more processors, the program instructions comprising:
    program instructions to receive a login request from a client and, in response, issue a token request to the client, wherein the token request identifies a plurality of token positions within a first ordered set of tokens generated by the client using a first seed and a first algorithm;

program instructions to receive a plurality of client tokens generated by the client based on the plurality of token positions within the first ordered set of tokens;

program instructions to generate a second ordered set of tokens based on the first seed and the first algorithm;

program instructions to authenticate the login request by comparing the plurality of client tokens with the second ordered set of tokens, based, at least in part, on the plurality of token positions and program instructions to grant access to an electronic resource by a communications link to the client and a server.

14. The computer system of claim 13, wherein the token request identifies the first algorithm.

15. The computer system of claim 14, further comprising: program instructions to receive the first seed from the client prior to receiving the login request, wherein the token request is issued in further response to program instructions to determine that the first seed matches a second seed included in the login request.

16. The computer system of claim 14, further comprising: program instructions to provide the first algorithm to the client prior to receiving the login request.

17. The computer system of claim 13, further comprising: program instructions to select the first algorithm from among a plurality of algorithms based, at least in part, on the login request, wherein the plurality of algorithms correspond to registered users.

* * * * *